United States Patent [19]

Nakao et al.

[11] Patent Number: 5,208,799
[45] Date of Patent: May 4, 1993

[54] MAGNETO-OPTIC RECORDING METHOD AND MAGNETO-OPTIC RECORDING/REPRODUCING APPARATUS

[75] Inventors: Isamu Nakao, Tokyo; Atsushi Fukumoto, Kanagawa; Toshiki Udagawa; Shunji Yoshimura, both of Tokyo, all of Japan

[73] Assignee: Sony Corporation, Tokyo, Japan

[21] Appl. No.: 832,384

[22] Filed: Feb. 7, 1992

[30] Foreign Application Priority Data

Feb. 8, 1991 [JP] Japan ................................ 3-018078

[51] Int. Cl.⁵ ............................................. G11B 13/04
[52] U.S. Cl. ...................................... 369/110; 369/13; 360/114
[58] Field of Search .................... 369/110, 13; 360/114

[56] References Cited

U.S. PATENT DOCUMENTS

| | | | |
|---|---|---|---|
| 4,771,413 | 9/1988 | Nago | 369/110 |
| 4,910,622 | 3/1990 | Saito et al. | 369/13 |
| 4,932,012 | 6/1990 | Kobayashi | 369/13 |
| 4,944,037 | 7/1990 | Ando | 369/100 |
| 4,983,025 | 1/1991 | Umemura | 360/114 |
| 5,018,119 | 5/1991 | Aratani et al. | 369/13 |
| 5,105,400 | 4/1992 | Kikitsu et al. | 369/13 |
| 5,118,541 | 6/1992 | Yamamoto et al. | 369/284 |
| 5,142,513 | 8/1992 | Takehara et al. | 369/13 |

FOREIGN PATENT DOCUMENTS 0318925 6/1989 European Pat. Off.
0393652 10/1990 European Pat. Off.
2-96926 4/1990 Japan.

Primary Examiner—Bruce C. Anderson
Attorney, Agent, or Firm—Hill, Steadman & Simpson

[57] ABSTRACT

A method and apparatus for recording and reproducing information onto and from a magneto-optic recording medium is disclosed. The magneto-optic recording medium has at least a reproducing layer and a recording layer. A recording optical head records information on the magneto-optic recording medium. A reproducing optical head has a reading light beam for reading information recorded in a region within a spot of the reading light beam by magneto-optic effect by changing a state of magnetization of the reproducing layer and at the same time irradiating the recording medium with the light beam. A wavelength of the recording light beam emitted by the recording optical head is substantially smaller than a wavelength of the reading light beam emitted by the reading optical head. A minimum ratio of the wavelength of the recording light beam to that of the reproducing light beam is 1:3.

10 Claims, 8 Drawing Sheets

MAGNETO-OPTIC RECORDING METHOD AND MAGNETO-OPTIC RECORDING/REPRODUCING APPARATUS

BACKGROUND OF THE INVENTION

The present invention relates to a magneto-optic recording method and a magneto-optic recording/reproducing apparatus.

In carrying out a magneto-optic recording/reproducing method that forms an information recording bit, i.e. a bubble magnetic domain, by magnetic field modulation or light modulation by local heating, for example with a laser beam, and reads the recorded information by the Kerr effect or the Faraday effect, the recording bit needs to be miniaturized to increase magneto-optic recording density. However, the miniaturization of the recording bit entails problems in resolution. Resolution is dependent, for example, on the radius R of the spot of the light beam, for example a laser beam, employed for recording and reproducing as a function of the wavelength λ of the laser beam and the numerical aperture N.A. of the objective lens (R ∝ λ/N.A.).

A conventional magneto-optic recording/reproducing system will be described with reference to FIGS. 1A, 1B, 1C and 1D. FIG. 1A is a typical top plan view of a recording pattern. A method of reproducing binary signals "1" and "0" recorded in recording bits 4, i.e. shaded portions in FIG. 1A, of a magneto-optic recording medium 3, such as a magneto-optic disk, will be described. A reading laser beam forms a circular spot 5 on the magneto-optic recording medium 3. When recording bits 4 are spaced so that the spot 5 is able to include a recording bit 4 as shown in FIG. 1A, the spot 5 includes a recording bit 4 as shown in FIG. 1B or the spot 5 does not include any recording bit 4 as shown in FIG. 1C. Accordingly, if the recording bits 4 are arranged at equal intervals, the output signal has, for example, a sinusoidal waveform whose amplitude varies alternately above and below a reference level 0 as shown in FIG. 1D.

However, if recording bits 4 are arranged in a high density as shown in a typical top plan view of recording pattern in FIG. 2A, it is possible that the spot 5 includes a plurality of recording bits 4. Since a reproduced output signal provided when the two recording bits 4a and 4b among the successive three recording bits 4a, 4b and 4c are included in one spot 5 as shown in FIG. 2B and a reproduced output signal provided when the two recording bits 4b and 4c are included in one spot 5 as shown in FIG. 2C are the same and cannot be discriminated from each other, the reproduced output signals form, for example, a straight line as shown in FIG. 2D.

Since the conventional magneto-optic recording/reproducing system reads directly the recording bits 4 recorded on the magneto-optic recording medium 3, restrictions on the reproducing resolution cause problems in S/N (C/N—carrier-to-noise ratio), and hence the magneto-optic recording/reproducing system is unable to achieve high-density recording and reproducing, even if the magneto-optic recording/reproducing system is capable of high-density recording, i.e., high-density bit formation.

The reproducing resolution dependent on the wavelength λ of the laser beam and the numerical aperture N.A. of the lens must be improved to solve the problems in S/N (C/N). To solve those problems, the applicant of the present patent application proposed previously a magneto-optic recording/reproducing system capable of very high resolution (hereinafter referred to as "MSR system"), for example, in Japanese Patent Application No. Hei 1-225685, "Magnetooptic Recording/Reproducing Method", incorporated herein by reference.

The MSR system enhances the reproducing resolution by reading only the recording bit 4 of a temperature in a predetermined temperature range on a magneto-optic recording medium by utilizing a temperature distribution formed by the relative movement between the magento-optic recording medium and the spot 5 of the reproducing beam.

The MSR systems are classified into those of a so-called emergence type and those of an extinction type.

The MSR system of an emergence type will be described with reference to FIGS. 3A and 3B. FIG. 3A is a typical top plan view of a recording pattern formed on a magneto-optic recording medium 10, and FIG. 3B is a typical sectional view showing a state of magnetization of the magneto-optic recording medium 10. As shown in FIG. 3A, the magneto-optic recording medium 10 moves in the direction of an arrow D relative to a spot 5. As shown in FIG. 3B, the magneto-optic recording medium 10 is, for example, a magneto-optic disk having at least a reproducing layer 11 and a recording layer 13 formed of perpendicularly magnetizable films, respectively. Preferably, the reproducing layer 11, the recording layer 13 and an intermediate layer 12 formed between the reproducing layer 11 and the recording layer 13 are provided. Arrows in the layers 11, 12 and 13 in FIG. 3B indicate the direction of magnetic moment. In FIG. 3B, magnetic domains indicated by downward arrows are in an initial state. Information recording bits 4 are formed at least in the recording layer 13 with magnetic domains magnetized upwardly.

In reproducing recorded information signals from the magneto-optic recording medium 10, an external initializing magnetic field $H_i$ is applied to the magneto-optic recording medium 10 to magnetize the reproducing layer 11 downward, as viewed in FIG. 3B, for initialization. Although the recording bits 4 of the reproducing layer 11 are extinguished by initialization, the respective directions of magnetization of regions in the reproducing layer 11 and the recording layer 13 corresponding to the recording bits 4 are maintained reverse to each other by magnetic domain walls formed in the intermediate layer 12, so that the recording bits 4 remain in latent recording bits 41.

A reproducing magnetic field H, of a direction reverse to that of the initializing magnetic field $H_i$ is applied at least to the reproducing regions of the magnetic recording medium 10. As the magneto-optic recording medium 10 moves, the region having the initialized latent recording bit 41 comes under the spot 5. Since the duration of irradiation with the beam at the front side, the left side in FIGS. 3A and 3B, on the magneto-optic recording medium 10 with respect to the direction of movement is longer, a high-temperature region 14 is formed in the front side of the spot 5 as indicated by a shaded area enclosed by a broken line a. In the high-temperature region 14, magnetic domain walls in the intermediate layer 12 disappear, and the magnetization of the recording layer 13 is transferred to the reproducing layer 11 by exchange force, so that the latent recording bit 41 in the recording layer 13 emerges in the reproducing layer 11 in a reproducible recording bit 4.

Accordingly, the recording bit 4 can be read by detecting the rotation of the plane of polarization of the spot 5 by magneto-optic effect, namely, the Kerr effect or Faraday effect, corresponding to the direction of magnetization of the reproducing layer 11. Latent recording bits 41 in a low-temperature region 15, other than the high-temperature region 14, in the spot 5 do not emerge into the reproducing layer 11, and hence the reproducible recording bit 4 is included only in the narrow high-temperature region 14. Therefore, even if information is recorded in a high recording density on the magneto-optic recording medium 10 capable of high-resolution recording, in which a plurality of recording bits 4 are included in the spot 5, only one of the recording bits 4 can be read for high-resolution signal reproducing.

To carry out signal reproducing in such a mode, the initializing magnetic field $H_i$, the reproducing magnetic field $H_r$, the respective coercive forces, values of thickness, intensities of magnetization, and values of domain wall energy of the magnetic layers are determined selectively according to the temperature of the high-temperature region 14 and that of the low-temperature region 15. The coercive force $H_{c1}$, thickness $h_1$ and saturation magnetization $M_{s1}$ of the reproducing layer 11, and the coercive force $H_{c3}$, thickness $h_3$ and saturation magnetization $M_{s3}$ of the recording layer 13 must meet the expression of Mathematical 1.

Mathematical 1

$$H_i > H_{c1} + \sigma_{w2}/2M_{s1} \cdot h_1$$

where $\sigma_{w2}$ is the interfacial domain wall energy between the reproducing layer 11 and the recording layer 13.

An expression of Mathematical 2 must be met to maintain the information recorded in the recording layer 13 by the magnetic field.

Mathematical 2

$$H_i < H_{c3} - \sigma_{w2}/2M_{s3} \cdot h_3$$

The expression of Mathematical 3 must be met to maintain the magnetic domain walls formed in the intermediate layer 12 between the reproducing layer 11 and the recording layer 13 after the initializing magnetic field $H_i$ has been applied to the magnetooptic recording medium.

Mathematical 3

$$H_{c1} > \sigma_{w2}/2M_{s1} \cdot h_1$$

The expression of Mathematical 4 must be met to heat the high-temperature region 14 at a selected temperature $T_H$.

Mathematical 4

$$H_{c1} - \sigma_{w2}/2M_{s1} \cdot h_1 < H_r < H_{c1} + \sigma_{w2}/2M_{s1} \cdot h_1$$

The magnetization of the latent recording bits 41 of the recording layer 13 can be transferred only in regions of the reproducing layer 11 corresponding to the magnetic domain walls of the intermediate layer 12 to form recording bits 4 by applying the reproducing magnetic field $H_r$ meeting the expression of Mathematical 4.

Although the magneto-optic recording medium 10 employed by the MSR system has the reproducing layer 11, the intermediate layer 12 and the recording layer 13, the MSR system may employ a four-layer magneto-optic recording medium additionally provided with an auxiliary reproducing layer 31 between the reproducing layer 11 and the intermediate layer 12 as shown in a typical sectional view in FIG. 4.

The auxiliary reproducing layer 31 supplements the characteristics of the reproducing layer 11 to compensate the coercive force of the reproducing layer 11 at room temperature to stabilize the magnetization of the reproducing layer 11 caused by the initializing magnetic field $H_i$, regardless of the existence of magnetic domain walls, and to decrease the coercive force sharply at a temperature near the reproducing temperature so that the magnetic domain walls of the intermediate layer 12 expand into the auxiliary reproducing layer 31 to finally invert the reproducing layer 11 and to extinguish the magnetic domain walls for satisfactory emergence of the recording bits.

The coercive force $H_{c1}$ of the reproducing layer 11 of a four-layer magneto-optic recording medium provided with the auxiliary reproducing layer 31 is substituted by $H_{CA}$ expressed by the expression in Mathematical 5, and where $\sigma_{w2}/M_{s1} \cdot h_1$ is substituted by $\sigma_{w2}/(M_{s1} \cdot h_1 + M_{s1s} \cdot h_{1s})$.

Mathematical 5

$$H_{CA} = (M_{s1} \cdot h_1 \cdot H_{c1} + M_{s1s} \cdot h_{1s} \cdot H_{c1s})/(M_{s1} \cdot h_1 + M_{s1s} \cdot h_{1s})$$

where $H_{c1} < H_{CA} < H_{c1s}$ for the MSR system of an emergence type, and $M_{s1s}$, $H_{c1s}$ and $h_{1s}$ are the magnetization, coercive force and thickness, respectively, of the auxiliary reproducing layer 31.

The MSR system of the extinction type will be described hereinafter with reference to FIGS. 5A and 5B. FIG. 5A is a typical top plan view of a recording pattern formed on a magneto-optic recording medium 10, and FIG. 5B is a typical sectional view showing a state of magnetization, in which parts like or corresponding to those shown in FIGS. 3A and 3B are denoted by the same reference characters. The description thereof will be omitted to avoid duplication. This magneto-optic recording medium does not need any initializing magnetic field $H_i$.

The reproducing operation for reproducing information recorded on the magneto-optic recording medium 10 will be described. The high-temperature region 14 is heated so that an expression in Mathematical 6 is satisfied, and then an external reproducing magnetic field $H_r$ is applied to the magneto-optic recording medium 10 to extinguish recording bits 4 in the high-temperature region 14 included in the spot 5 of a laser beam in the reproducing layer 11 magnetized downward as viewed in FIG. 5B. Thus, the MSR system of the extinction type enables information stored in only the recording bits 4 in the low-temperature region 15 in the spot 5 to be reproduced to improve the resolution.

Mathematical 6

$$H_r > H_{c1} + \sigma_{w2}/2M_{s1} \cdot h_1$$

However, the conditions, including the coercive force, are determined so that the recording bits 4 of the recording layer 13 remain in latent recording bits 41 in an extinction state to hold the magnetization of the recording layer 13, and the recording bits 4 are transferred to the reproducing layer 11 and held therein in a reproducible state at room temperature.

The foregoing MSR systems of an emergence type and an extinction type reproduce the recording bit in a local region included in the spot of the reproducing laser beam to reproduce the information in an enhanced resolution.

It is also possible to reproduce recorded information by an MSR system of a combined type having functions of both the MSR system of an emergence type and the MSR system of an extinction type. The MSR system of a combined type forms a high-temperature region 14, a middle-temperature region 16 and a low-temperature region 15 in the front portion, middle portion and rear portion with respect to the direction of movement of the magneto-optic recording medium relative to a spot 5 as shown in FIG. 6, and utilizes the high-temperature region 14 for the functions of the extinction type described with reference to FIGS. 5A and 5B, and the middle-temperature region 16 and the low-temperature region 15 for the functions of the emergence type described with reference to FIGS. 3A and 3B.

The MSR system of a combined system is able to make only a recording bit 4 emerge into the reproducing layer 11, a shaded circle in FIG. 6, and included in the narrow middle-temperature region 16 between the high-temperature region 14 and the low-temperature region 15. Accordingly, the MSR system of a combined type is capable of reproducing recorded information in higher resolution.

Thus, the MSR systems are able to reproduce recorded information in a very high resolution regardless of the wavelength λ of the laser beam and the numerical aperture N.A. of the objective lens.

Accordingly, the MSR system need not use a reading light beam of a particularly short wavelength and is able to determine the wavelength of reading light beam taking into consideration magneto-optic effect, heating effect, and the sensitivity of the optical detector.

That is, the MSR system is able to reproduce recorded information in a high resolution even if the same uses a semiconductor laser beam having a comparatively large wavelength, such as 780 nm.

The MSR system capable of reproducing recorded information in a very high reproducing resolution enables high-density recording, namely, miniaturization of recording bits and reduction of the pitch of recording bits.

However, if minute bits are formed by using such a reproducing semiconductor laser beam for recording, namely if minute bits are formed by the same spot as that for reproducing (reading), the magneto-optic recording medium must be heated by the laser beam in a temperature distribution having a peak corresponding to a temperature $T_w$ capable of forming a recording bit, for example, the Curie temperature, and the recording bit must be formed in a width corresponding to a small region $\Phi_p$ as shown in FIGS. 5A and 5B, which requires strict conditions for materials forming the magnetic layers of the magneto-optic recording medium and the power of the recording laser beam.

Such strict conditions entail problems in recording and reproducing characteristics, time-dependent variation, lifetime and reliability.

SUMMARY OF THE INVENTION

It is an object of the present invention to solve problems in recording density, reliability and lifetime in using a magneto-optic recording medium, such as a magneto-optic disk, from which information can be reproduced by the MSR system.

It is a further object of the present invention to enable high-density magneto-optic recording and information reproducing at a high resolution, and to improve reliability and lifetime.

According to the invention, a magneto-optic recording/reproducing apparatus employs a magneto-optic recording medium having at least a reproducing layer and a recording layer which changes the state of magnetization of the reproducing layer. The reproducing layer is irradiated with a reading light beam to read information recorded in a region smaller than a spot of the reading light beam by the magneto-optic effect. The wavelength of a recording light beam is far smaller than that of the reading light beam. A minimum ratio between the wavelength of the recording light beam to that of the reading light beam is 1:3.

DESCRIPTION OF THE PREFERRED EMBODIMENTS

A magneto-optic recording method in accordance with the present invention employs a magneto-optic recording medium 10 such as described with reference to FIGS. 3A to 6, having at least a reproducing layer 11 and a recording layer 13, from which recorded information is read by the magneto-optic effect in a region smaller than the spot 5 of a reading light beam by simultaneously changing the state of magnetization of the reproducing layer 11 and irradiating the same with the reading light beam.

The wavelength of the recording light beam used for recording information in the magneto-optic recording medium is far smaller than that of the reading light beam.

Figure 8:
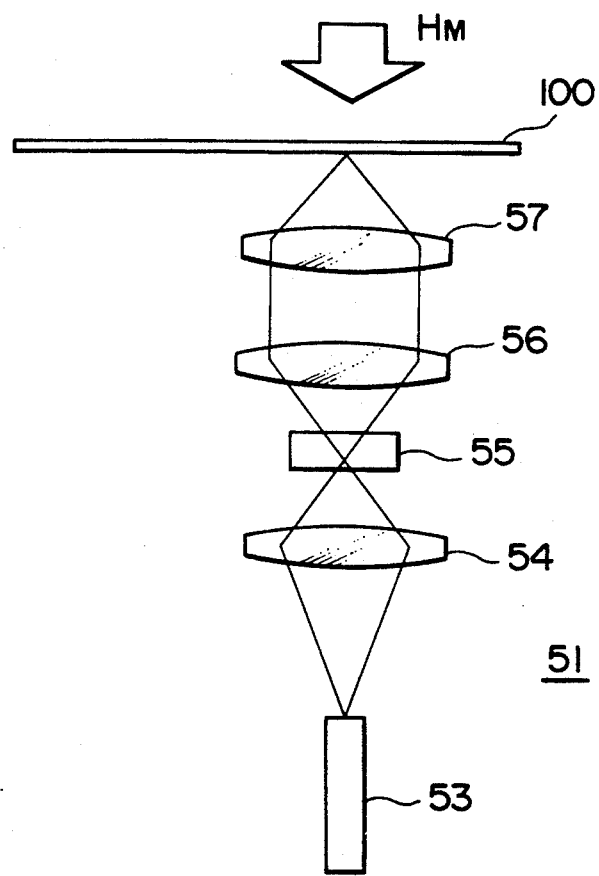
FIG. 8 is a diagrammatic view of a recording optical head employed in a magneto-optic recording/reproducing apparatus in accordance with the present invention.
Figure 9:
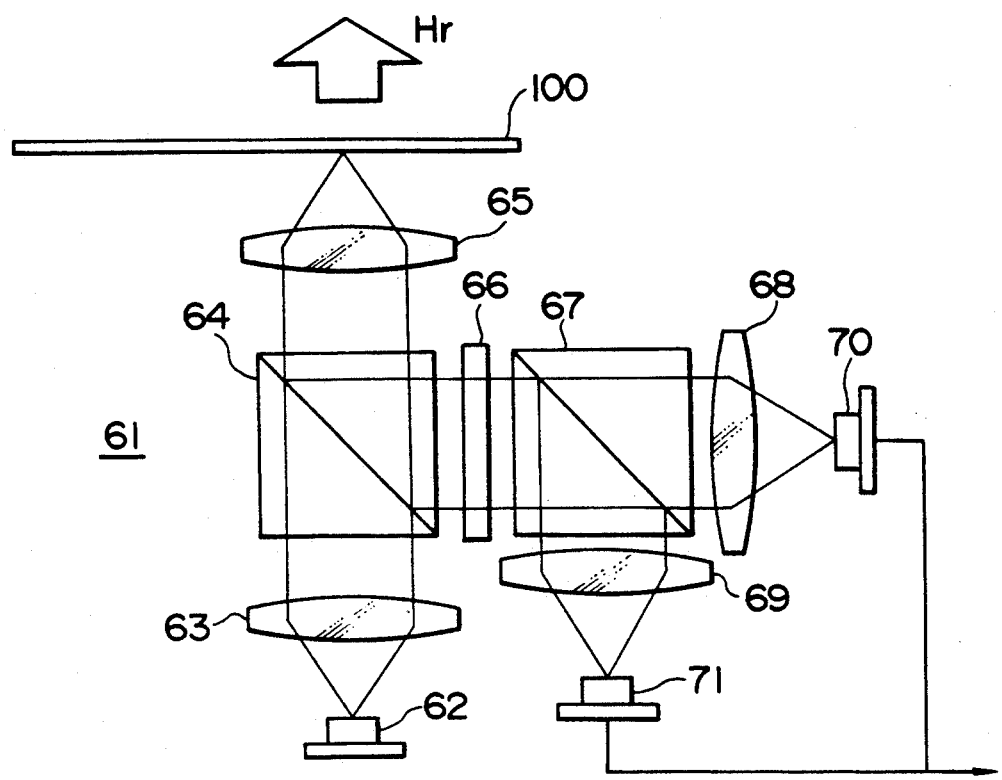
FIG. 9 is a diagrammatic view of a reproducing optical head employed in the magneto-optic recording/reproducing apparatus in accordance with the present invention.
Figure 10:
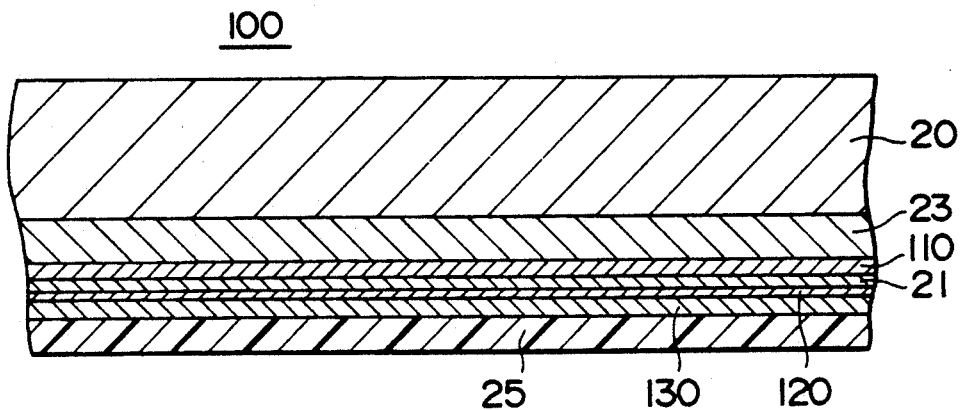
FIG. 10 is a schematic sectional view of a magneto-optic recording medium according to the present invention.

A magneto-optic recording/reproducing apparatus in accordance with the present invention employs a magneto-optic recording medium 100 as shown in FIGS. 8, 9, and 10 having at least a reproducing layer 110 and a recording layer 130, from which recorded information is read by the magneto-optic effect in a small region smaller than the spot of a reading light beam by simultaneously changing the stat of magnetization of the reproducing layer 110 and irradiating the same with the reading light beam.

A recording optical head 51 is disposed relative to a magneto-optic recording medium 100 as shown in FIG. 8, and a reproducing optical head 61 is disposed relative to the magneto-optic recording medium 100 as shown in FIG. 9.

The wavelength of a light beam emitted by the recording optical head 51 is far smaller than that of a light beam emitted by the reproducing optical head 61.

Since the present invention uses a recording light beam having a wavelength far smaller than that of a reproducing light beam for recording, recording bits can be miniaturized and the pitch of the recording bits can be reduced.

FIG. 8 shows a recording optical head by way of example. This recording optical head applies an external recording magnetic field $H_M$ to a magneto-optic recording medium for recording by light modulation.

The recording optical head employs a recording light source 53 that emits green light of 532 nm in wavelength. The light emitted by the recording light source 53 travels through a converging lens system 54, a light modulator 55, a collimator lens 56 and an objective lens 57, and is focused on the magneto-optic recording medium 100, such as a magneto-optic disk.

The recording light source 53 employs a green laser that emits second harmonic green laser light of 532 nm in wavelength by applying the light emitted by a Nd:YAG laser (1064 nm in wavelength) excited by a semiconductor laser beam of 810 nm in wavelength to a nonlinear optical crystal of, for example, KTP (KTiOPO$_4$).

The light modulator may be an acousto-optic modulator, i.e., a so-called AMO. The AMO 55 modulates the laser beam according to recording signals represented by "1" and "0".

A predetermined recording magnetic field $H_M$ is applied to the magneto-optic recording medium 100 and, at the same time, a region of the magneto-optic recording medium 100 in which a recording bit is to be formed is heated at a temperature $T_w$, such as a temperature not lower than the Curie temperature, by irradiating the region with a laser beam having a short wavelength and modulated according to a recording signal, for example, a recording signal represented by "1", to magnetize the region in the same direction as the recording magnetic field $H_M$ to record the recording signal represented by "1" in a recording bit.

A reproducing optical head 61 has a reproducing light source 62 that emits a reproducing light beam having a comparatively large wavelength.

The reproducing light source is a semiconductor laser that emits linearly polarized light of 780 nm in wavelength.

A minimum ratio between the wavelength of the recording light beam to that of the reading light beam is 1:3.

The reading light beam emitted by the reproducing light source 62, i.e. the semiconductor laser, travels through, for example, a collimator lens 63, a beam splitter 64 and an objective lens, and is focused on the magneto-optic recording medium 100.

The reflected light beam reflected by the magneto-optic recording medium 100, namely, the light beam rotated by the Kerr rotation effect of the recording bit, is split by the beam splitter 64. The split reflected light beam travels through a half-wave plate 66. Then, the split reflected light beam is split by a beam splitter 67. The split light beams travel through converging lenses 68 and 69, respectively, and fall on optical detectors 70 and 71, such as pin-type diodes, respectively. The output signals of the optical detectors 70 and 71 are picked up differentially to read the recorded signal.

As shown in a schematic sectional view in FIG. 10, the magneto-optic recording medium 100 has a transparent dielectric layer 23 of, for example, a SiN film of 800 Å in thickness that serves as a protective film or an interference film, a reproducing layer 110, an auxiliary reproducing layer 21, an intermediate layer 120 and a recording layer 130 formed sequentially in that order by continuous sputtering on a transparent substrate 20 of, for example, glass, an acrylic resin or a polycarbonate resin. A protective film 25 of a nonmagnetic metal or a dielectric material, such as a SiN film of 800 Å in thickness, is formed on the recording layer 130.

The reproducing layer 110, the auxiliary reproducing layer 21, the intermediate layer 120 and the recording layer 130 are magnetic films of rare earth metal-transition metal alloys.

The reproducing layer 110 is, for example, a perpendicularly magnetizable film of $Gd_{23}(Fe_{85}Co_{15})_{77}$ having a thickness of, for example, 300 Å.

The auxiliary reproducing layer 31 is, for example, a perpendicularly magnetizable film of $Tb_{12}(Fe_{95}Co_5)_{88}$ having a thickness of, for example, 100 Å.

The intermediate layer 120 is, for example, a magnetic film of $Gd_{20}(Fe_{95}Co_5)_{80}$ having a thickness of, for example, 100 Å and small in perpendicular anisotropy.

The recording layer 130 is, for example, a perpendicularly magnetizable film of $Tb_{25}(Fe_{85}Co_{15})_{75}$ having a thickness of, for example, 400 Å.

Figure 1A:
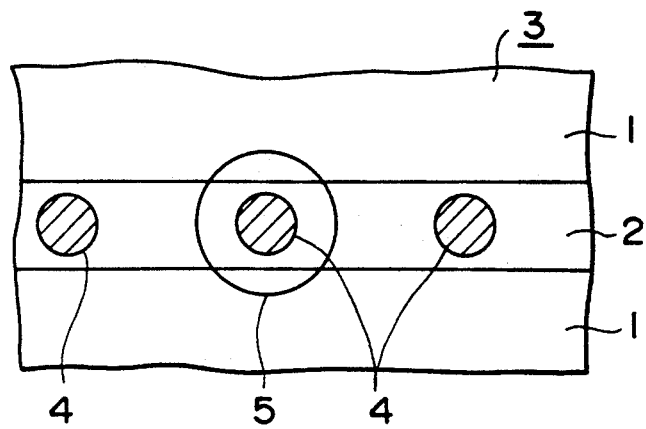
FIGS. 1A, 1B, 1C and 1D are views for assistance in explaining a conventional magneto-optic recording/reproducing method.
Figure 1B:
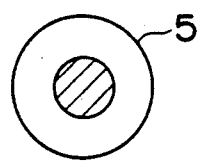
Figure 1C:
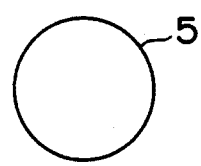
Figure 1D:
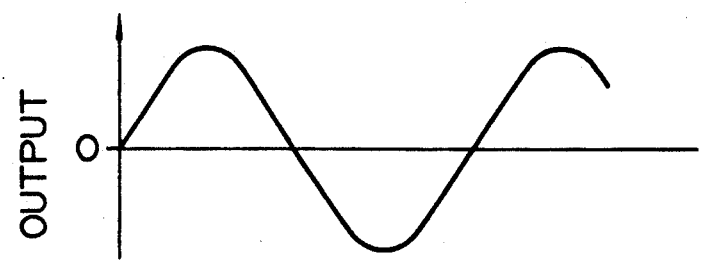
Figure 2A:
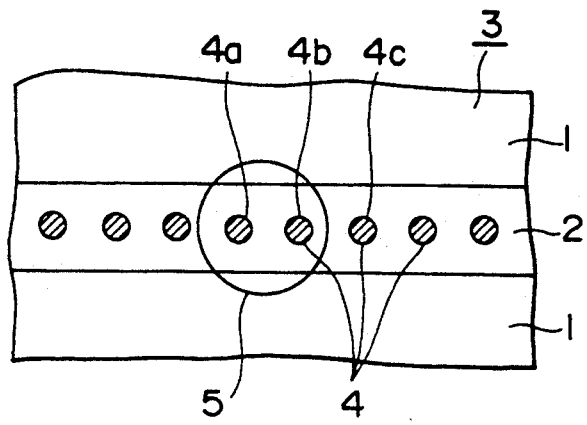
FIGS. 2A, 2B, 2C and 2D are views which assist in explaining a conventional magneto-optic recording/reproducing method.
Figure 2B:
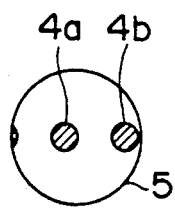
Figure 2C:
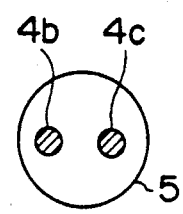
Figure 2D:
Figure 3A:
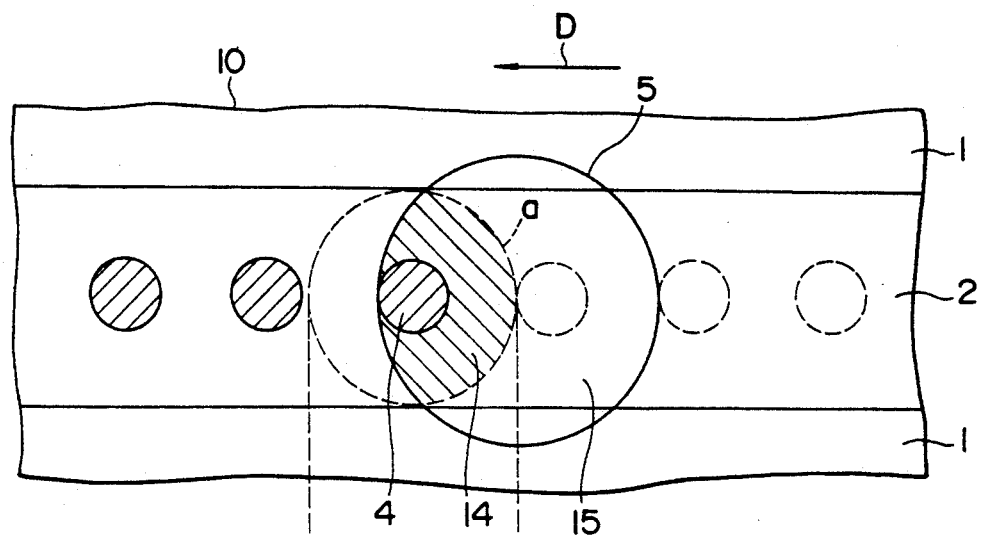
FIGS. 3A and 3B are views which assist in explaining an MSR system of an emergence type.
Figure 3B:
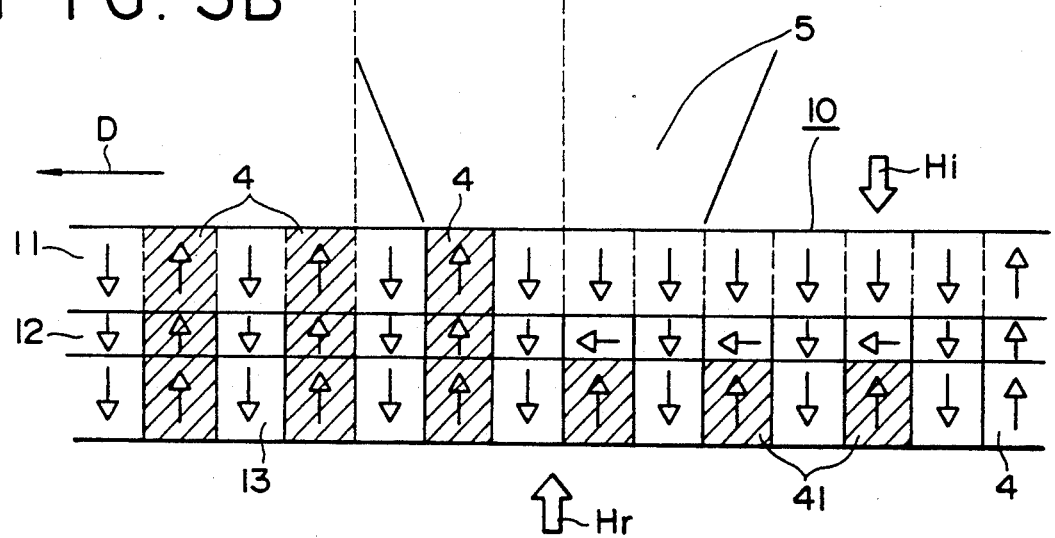
Figure 4:
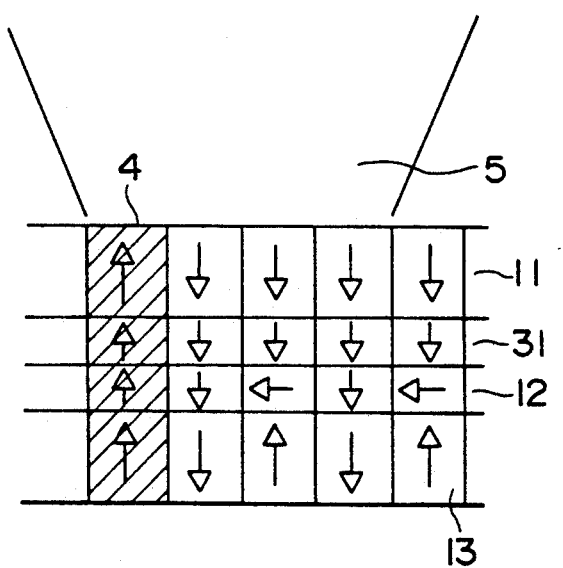
FIG. 4 is a typical sectional view of a magneto-optic recording medium.
Figure 5A:
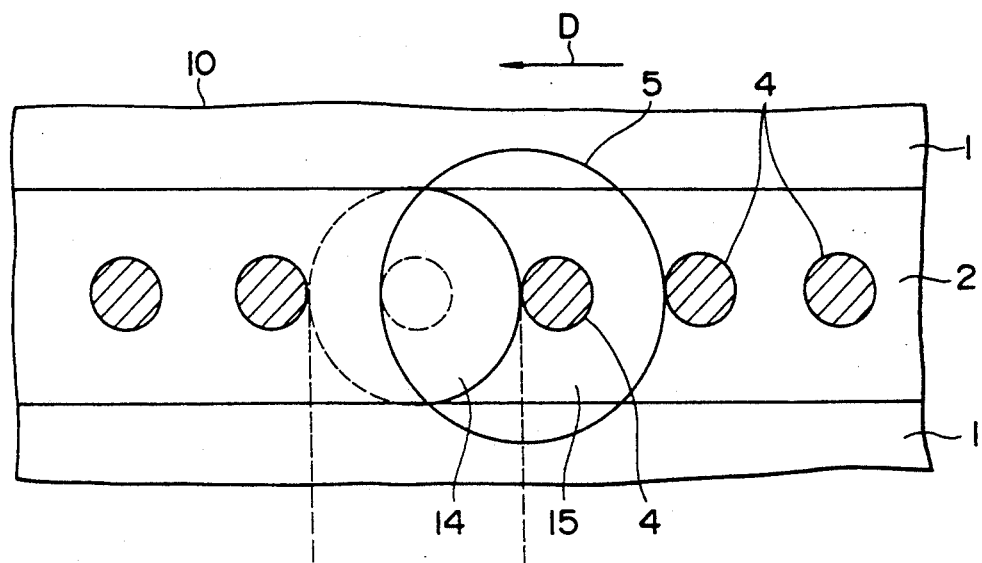
FIGS. 5A and 5B are views for assisting in explaining an MSR system of a extinction type.
Figure 5B:
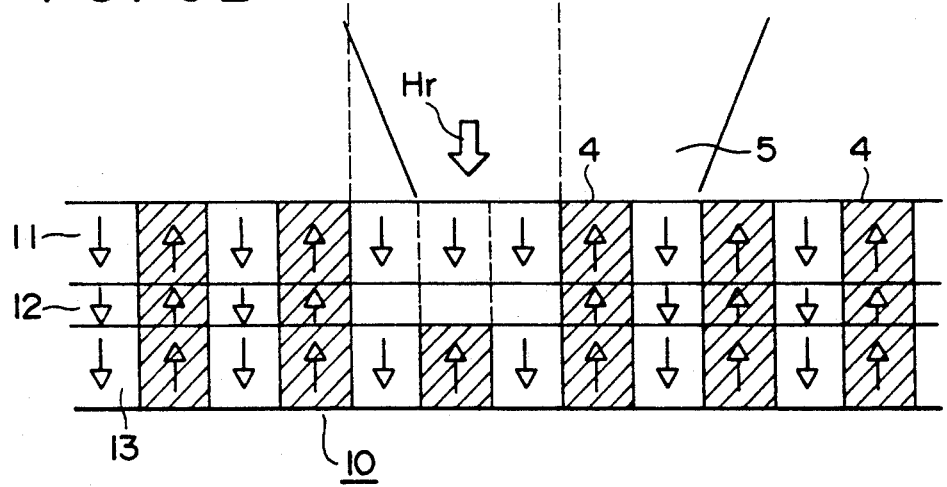
Figure 6:
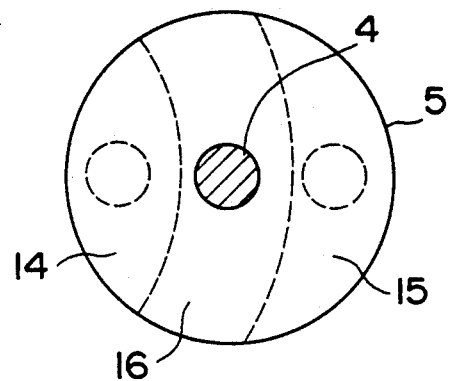
FIG. 6 is a view which assists in explaining another MSR system.
Figure 7:
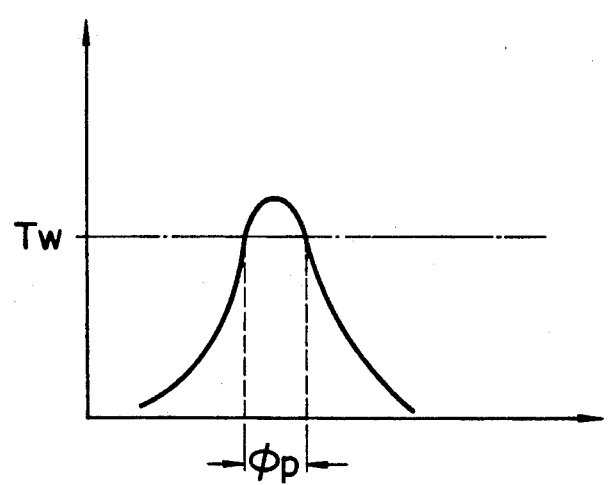
FIG. 7 is a graph showing a temperature distribution.

The reproducing operation of the reproducing optical head is carried out by the foregoing MSR system, namely, the MSR system of an emergence type described with reference to FIGS. 3A and 3B, the MSR system of an extinction type described with reference to FIGS. 5A and 5B, or the MSR system of a combined type.

A possible magneto-optic recording medium need not be limited to the foregoing magneto-optic recording medium of a four-layer construction having the reproducing layer 110, the auxiliary reproducing layer 21, the intermediate layer 120 and the recording layer 130; a magneto-optic recording medium of a three-layer construction having a reproducing layer 110, an intermediate layer 120 and a recording layer 130 formed of rare earth metal-transition metal alloys may be employed.

A possible magneto-optic recording medium of a three-layer construction may have a reproducing layer 110 of $Gd_{23}(Fe_{85}Co_{15})_{77}$, an intermediate layer 120 of $Tb_{18}Fe_{82}$ and a recording layer 130 of $Tb_{25}(Fe_{85}Co_{15})_{75}$.

The foregoing compositions of the layers are not restrictive and varieties of compositions are possible.

The recording optical head 51 and the reproducing optical head 61 may be incorporated into a magneto-optic recording/reproducing driver or may be formed individually in a recording driver and a reproducing driver, respectively.

As is apparent from the foregoing description, the present invention uses for recording information a recording light beam of a wavelength far smaller than that of a reproducing light beam and hence information can surely and easily be recorded in a high recording density at least with respect to the scanning direction of the light spot, namely, in a high scanning density.

Accordingly, as stated in the beginning, the present invention eliminates the strict conditions for the composition and temperature characteristics of the component layers of the magneto-optic recording medium and improves the reliability.

Although various minor changes and modifications might be proposed by those skilled in the art, it will be understood that we wish to include within the claims of the patent warranted hereon all such changes and modifications as reasonably come within our contribution to the art.

We claim as our invention:

1. A method for magneto-optic recording and reading, comprising the steps of:
   employing a magneto-optic recording medium having at least a reproducing layer and a recording layer;
   recording information on the magneto-optic recording medium with a recording light beam in a region smaller than a spot of a reading light beam employed for reading;
   reading the recorded information by magneto-optic effect by changing a state of magnetization of the reproducing layer and, at a same time, irradiating the magneto-optic recording medium with the reading light beam; and
   a wavelength of said recording light beam being substantially smaller than a wavelength of the reading light beam.

2. A magneto-optic recording/reproducing apparatus for recording information on and reading information from a magneto-optic recording medium having at least a reproducing layer and a recording layer, comprising:
   a recording optical head means having a recording light beam for recording information on the magneto-optic recording medium in a region smaller than a spot of a reading light beam employed for reading;
   a reproducing optical head means having said reading light beam for reading information by magneto-optic effect by changing a state of magnetization of the reproducing layer and at the same time irradiating the recording medium with the light beam; and
   a wavelength of the recording light beam emitted by the recording optical head means being substantially smaller than a wavelength of the reading light beam emitted by the reading optical head means.

3. A method for magneto-optic recording/reproducing employing a magneto-optic recording medium having a laminate construction of a reproducing layer and a record hold layer which are coupled magnetically, comprising the steps of:
   applying an external initializing magnetic field to the magneto-optic recording medium to turn a direction of magnetization of the reproducing layer in a direction for initialization before reproducing a recorded magnetic information;
   heating the magneto-optic recording medium and at a same time applying a magnetic field to the magneto-optic recording medium to transfer the recorded magnetic information from the record hold layer to the reproducing layer;
   reading the magnetic information from the reproducing layer by photoelectromagnetic effect; and
   providing a wavelength of a recording light beam for recording information on the magneto-optic recording medium substantially smaller than a wavelength of a reading light beam for reading the recorded information from the reproducing layer of the magneto-optic recording medium.

4. A method of reproducing a signal recorded in a magnetic domain of a magneto-optic recording medium, comprising the steps of:
   providing the magnetic medium as a first magnetic film, a second magnetic film and a third magnetic film which are coupled magnetically at a room temperature $T_{RT}$, respective Curie points $T_{c1}$, $T_{c2}$, and $T_{c3}$ of the first, second and third magnetic films meeting conditions expressed by inequalities: $T_{c2} > T_{RT}$, $T_{c2} < T_{c1}$, and $T_{c2} < T_{c3}$, a coercive force $H_{c1}$ of the first magnetic film being relatively small at a temperature substantially equal to the Curie point $T_{c2}$ of the second magnetic film, and a coercive force $H_{c3}$ of the third magnetic film being substantially greater than a required magnetic field intensity in a temperature range between the room temperature $T_{RT}$ and a predetermined temperature $T_{PB}$ higher than the Curie point $T_{c2}$ of the second magnetic film;
   heating the magneto-optic recording medium at the predetermined temperature $T_{PB}$ to cancel the magnetic coupling of the first and third magnetic films and, at a same time, applying a magnetic field to cancel the magnetic fields or stray magnetic fields created by the magneto-optic recording medium, and to change a size of a magnetic domain in the first magnetic film; and
   providing a wavelength of a recording light beam for recording signals on the magneto-optic recording medium substantially smaller than a wavelength of a reproducing light beam for reproducing the recording signals.

5. A method for magneto-optic reproduction employing a magneto-optic recording medium having a laminate construction comprised of a reproducing layer, an intermediate layer and a record hold layer which are coupled magnetically, comprising the steps of:
   applying an initializing magnetic field to the magneto-optic recording medium to turn a direction of magnetization of the reproducing layer in a direction for initialization after signals have been recorded in the record hold layer of the magneto-optic recording medium;
   irradiating the reproducing layer with a reading laser beam while a reproducing magnetic field is applied to the magneto-optic recording medium to heat an area of the reproducing layer corresponding to a spot of the laser beam in temperature distribution so as to form a first region in which a state of magnetization formed by the initialization is maintained, a second region to which a magnetic domain pattern of the record hold layer is transferred, and a third region in which the direction of magnetization is turned in a direction of the reproducing magnetic field, said three regions being formed in the area of the reproducing layer corresponding to the spot of the laser beam;

reading a magnetic signal in the second region of the reproducing layer to which the magnetic domain pattern of the record hold layer is transferred by converting a magnetic signal into an optical signal by photoelectromagnetic effect; and providing a wavelength of a recording laser beam for recording signals on the magneto-optic recording medium substantially smaller than a wavelength of the reading laser beam.

6. A magneto-optic recording/reproducing apparatus for recording information on and reading information from a magneto-optic recording medium having at least a reproducing layer and a recording layer, comprising:

a recording optical head means having a recording light beam for recording information on the magneto-optic recording medium;

a reproducing optical head means having a reading light beam for reading information from the reproducing layer; and a wavelength of the recording light beam emitted by the recording optical head means being substantially smaller than a wavelength of the reading light beam emitted by the reading optical head means.

7. An apparatus according to claim 6 wherein the reproducing optical head means reads information recorded in a region smaller than a spot of the reading light beam by magneto-optic effect by changing a state of magnetization of the reproducing layer and at the same time irradiating the recording medium with the light beam.

8. An apparatus according to claim 6 wherein the wavelength of the recording light beam is approximately 530 nm and a wavelength of the reproducing light beam is approximately 780 nm.

9. An apparatus according to claim 6 wherein a difference between the reproducing and recording light beam wavelengths is approximately 248 nm.

10. An apparatus according to claim 6 wherein a minimum ratio of the wavelength of the recording light beam to the wavelength of the reproducing light beam is 1:3.

* * * * *